US012236426B2

(12) United States Patent
Sukhija et al.

(10) Patent No.: US 12,236,426 B2
(45) Date of Patent: Feb. 25, 2025

(54) METHOD AND SYSTEM FOR DYNAMICALLY PROCESSING FINANCIAL TRANSACTIONS

(71) Applicant: Visa International Service Association, San Francisco, CA (US)

(72) Inventors: Rohit Sukhija, Whitefield (IN); Rahul Singhal, Whitefield (IN); Surendra Vyas, Gunjur (IN)

(73) Assignee: Visa International Service Association, San Francisco, CA (US)

( * ) Notice: Subject to any disclaimer, the term of this patent is extended or adjusted under 35 U.S.C. 154(b) by 151 days.

(21) Appl. No.: 17/199,611

(22) Filed: Mar. 12, 2021

(65) Prior Publication Data
US 2022/0292504 A1   Sep. 15, 2022

(51) Int. Cl.
| | |
|---|---|
| *G06Q 20/40* | (2012.01) |
| *G06Q 20/10* | (2012.01) |
| *G06Q 20/18* | (2012.01) |
| *G06Q 20/20* | (2012.01) |
| *H04L 41/02* | (2022.01) |
| *H04L 41/0273* | (2022.01) |

(52) U.S. Cl.
CPC ....... *G06Q 20/4012* (2013.01); *G06Q 20/102* (2013.01); *G06Q 20/18* (2013.01); *G06Q 20/20* (2013.01); *H04L 41/0273* (2013.01)

(58) Field of Classification Search
None
See application file for complete search history.

(56) References Cited

U.S. PATENT DOCUMENTS

| | | | |
|---|---|---|---|
| 7,856,399 B2 | 12/2010 | Wilkes | |
| 11,023,873 B1 * | 6/2021 | Grassadonia | G06Q 40/03 |
| 11,127,004 B2 * | 9/2021 | Lorberg | G06Q 30/06 |
| (Continued) | | | |

FOREIGN PATENT DOCUMENTS

| | | | | |
|---|---|---|---|---|
| CA | 2949366 A1 | * | 11/2015 | ........... G06Q 20/102 |
| CA | 2949366 C | * | 3/2020 | ........... G06Q 20/102 |

OTHER PUBLICATIONS

Sarin, N., "Essays on Financial Regulation", Harvard University, ProQuest Dissertations & Theses. (2019) (Year: 2019).*

*Primary Examiner* — Clay C Lee
(74) *Attorney, Agent, or Firm* — The Webb Law Firm

(57) ABSTRACT

The present disclosure discloses a method and system for dynamically processing financial transactions. The method includes receiving a transaction request including at least one unique identifier field to transfer payment into an account associated with a payment instrument and authorizing the transaction request based on one or more predetermined rules. The payment instrument is used at an electronic device by a merchant for transfer of the payment from a merchant account. Thereafter, the method includes generating a direct fund transfer message based on the at least one unique identifier field upon authorization of the transaction request and transmitting the direct fund transfer message to an issuer associated with the merchant account for authentication of the direct fund transfer message. Lastly, the method includes transferring dynamically the payment from the merchant account to the account associated with the payment instrument when the direct fund transfer message is authenticated by the issuer.

8 Claims, 4 Drawing Sheets

(56) References Cited

U.S. PATENT DOCUMENTS

| | | | |
|---|---|---|---|
| 2004/0153399 A1* | 8/2004 | Wilkes | G06Q 20/108 |
| | | | 705/39 |
| 2014/0156512 A1* | 6/2014 | Rahman | G06Q 20/326 |
| | | | 705/39 |
| 2014/0278576 A1* | 9/2014 | Mariyal | G06Q 40/02 |
| | | | 705/4 |
| 2015/0332228 A1* | 11/2015 | Kimberg | G06Q 20/108 |
| | | | 705/40 |
| 2016/0371682 A1* | 12/2016 | Sprague | G06Q 20/20 |
| 2019/0317651 A1* | 10/2019 | Chopra | G06F 21/6245 |
| 2020/0104942 A1* | 4/2020 | Riechers | G06Q 20/227 |
| 2020/0184550 A1* | 6/2020 | Frohwein | G06Q 30/0215 |
| 2020/0258065 A1* | 8/2020 | Matson | G06Q 20/202 |
| 2021/0042722 A1* | 2/2021 | Wolter | G06Q 20/202 |

\* cited by examiner

METHOD AND SYSTEM FOR DYNAMICALLY PROCESSING FINANCIAL TRANSACTIONS

BACKGROUND

1. Technical Field

The present subject matter is generally related to a field of transaction security, more particularly, but not exclusively, to a method and a transaction processing system for dynamically processing financial transactions.

2. Technical Considerations

In a four-party model, a merchant receives fund or payment a few days after the transaction. This is a part of the merchant contract with an acquirer where an acquirer can charge a higher Merchant Discount Rate (MDR) for early funding. For many Small and Medium Enterprises (SMEs), working capital is an important part of their business, especially for enterprises which are in the trading business. Early access to funds can help merchants fund their next purchase or let them spend their earnings for personal consumption since most SMEs are run by proprietors (or individuals). There is no solution for SME merchants get quick access to their funds that they can acquire the same day using their existing Point-of-Sale (POS) terminal processes.

The information disclosed in this background of the disclosure section is for enhancement of understanding of the general background of the disclosure and should not be taken as an acknowledgement or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure. There is a need for an improved solution to provide SME merchants with a quick access to their funds the same day using their existing POS terminal.

In non-limiting embodiments or aspects, provided is a method for dynamically processing financial transactions, the method comprising: receiving, by a transaction processing system, a transaction request comprising at least one unique identifier field initiated by an electronic device, associated with the transaction processing system, to transfer payment into an account associated with a payment instrument, wherein the payment instrument is used at the electronic device by a merchant for transfer of the payment from a merchant account; authorizing, by the transaction processing system, the transaction request received from the electronic device based on one or more predetermined rules; generating, by the transaction processing system, a direct fund transfer message based on the at least one unique identifier field upon authorization of the transaction request; transmitting, by the transaction processing system, the direct fund transfer message to an issuer associated with the merchant account for authentication of the direct fund transfer message; and transferring dynamically, by the transaction processing system, the payment from the merchant account to the account associated with the payment instrument when the direct fund transfer message is authenticated by the issuer.

In some non-limiting embodiments or aspects, the electronic device is one of a Point-of-Sale (POS) terminal and a kiosk device. In some non-limiting embodiments or aspects, the one or more predetermined rules comprise at least one of the following: a POS Personal Identification Number (PIN), a POS identifier, a merchant identifier, capital balance in the account, a past daily average capital amount, or any combination thereof. In some non-limiting embodiments or aspects, the at least one unique identifier field indicates the request for transferring the payment from the merchant account.

In some non-limiting embodiments or aspects, the direct fund transfer message comprises at least one of the following: International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof. In some non-limiting embodiments or aspects, the method further comprises denying, by the transaction processing system, transfer of the payment from the merchant account to the account associated with the payment instrument used at the electronic device associated with the transaction processing system when the authentication of the direct fund transfer message is unsuccessful at the issuer. In some non-limiting embodiments or aspects, the authentication by the issuer is based on at least one of the following: an issuer's eligibility for transferring payment, a daily limit to perform the direct fund transfer, network failure in a transaction path, compliance to business rules, compliance to fraud prevention rules, or any combination thereof.

In non-limiting embodiments or aspects, provided is a transaction processing system for dynamically processing financial transactions, the transaction processing system comprising: at least one processor; and a memory communicatively coupled to the at least one processor, wherein the memory stores processor-executable instructions, which on execution, cause the at least one processor to: receive a transaction request comprising at least one unique identifier field initiated by an electronic device, associated with the transaction processing system, to transfer payment into an account associated with a payment instrument, wherein the payment instrument is used at the electronic device by a merchant for transfer of the payment from a merchant account; authorize the transaction request received from the electronic device based on one or more predetermined rules; generate a direct fund transfer message based on the at least one unique identifier field upon authorization of the transaction request; transmit the direct fund transfer message to an issuer associated with the merchant account for authentication of the direct fund transfer message; and transfer dynamically the payment from the merchant account to the account associated with the payment instrument when the direct fund transfer message is authenticated by the issuer.

In some non-limiting embodiments or aspects, the electronic device is one of a Point-of-Sale (POS) terminal and a kiosk device. In some non-limiting embodiments or aspects, the one or more predetermined rules comprise at least one of the following: a POS Personal Identification Number (PIN), a POS identifier, a merchant identifier, capital balance in the account, a past daily average capital amount, or any combination thereof. In some non-limiting embodiments or aspects, the at least one unique identifier field indicates the request for transferring the payment from the merchant account.

In some non-limiting embodiments or aspects, the direct fund transfer message comprises at least one of the following: International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof. In some non-limiting embodiments or aspects, the processor is configured to deny transfer of the payment from the merchant account to the account associated with the payment instrument used at the electronic device associated with the transaction processing system when the authentication of the direct fund transfer message is unsuccessful at the issuer. In some non-limiting embodiments or aspects, the authentication by the issuer is based on at least one of the following: an issuer's eligibility for transferring payment, a daily limit to perform the direct fund transfer, network failure in a transaction path, compliance to business rules, compliance to fraud prevention rules, or any combination thereof.

Further non-limiting embodiments or aspects are set forth in the following numbered clauses:

Clause 1: A method for dynamically processing financial transactions, the method comprising: receiving, by a transaction processing system, a transaction request comprising at least one unique identifier field initiated by an electronic device, associated with the transaction processing system, to transfer payment into an account associated with a payment instrument, wherein the payment instrument is used at the electronic device by a merchant for transfer of the payment from a merchant account; authorizing, by the transaction processing system, the transaction request received from the electronic device based on one or more predetermined rules; generating, by the transaction processing system, a direct fund transfer message based on the at least one unique identifier field upon authorization of the transaction request; transmitting, by the transaction processing system, the direct fund transfer message to an issuer associated with the merchant account for authentication of the direct fund transfer message; and transferring dynamically, by the transaction processing system, the payment from the merchant account to the account associated with the payment instrument when the direct fund transfer message is authenticated by the issuer.

Clause 2: The method of clause 1, wherein the electronic device is one of a Point-of-Sale (POS) terminal and a kiosk device.

Clause 3: The method of clause 1 or 2, wherein the one or more predetermined rules comprise at least one of the following: a POS Personal Identification Number (PIN), a POS identifier, a merchant identifier, capital balance in the account, a past daily average capital amount, or any combination thereof.

Clause 4: The method of any of clauses 1-3, wherein the at least one unique identifier field indicates the request for transferring the payment from the merchant account.

Clause 5: The method of any of clauses 1-4, wherein the direct fund transfer message comprises at least one of the following: International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof.

Clause 6: The method of any of clauses 1-5 comprises denying, by the transaction processing system, transfer of the payment from the merchant account to the account associated with the payment instrument used at the electronic device associated with the transaction processing system when the authentication of the direct fund transfer message is unsuccessful at the issuer.

Clause 7: The method of any of clauses 1-6, wherein the authentication by the issuer is based on at least one of the following: an issuer's eligibility for transferring payment, a daily limit to perform the direct fund transfer, network failure in a transaction path, compliance to business rules, compliance to fraud prevention rules, or any combination thereof.

Clause 8: A transaction processing system for dynamically processing financial transactions, the transaction processing system comprising: at least one processor; and a memory communicatively coupled to the at least one processor, wherein the memory stores processor-executable instructions, which on execution, cause the at least one processor to: receive a transaction request comprising at least one unique identifier field initiated by an electronic device, associated with the transaction processing system, to transfer payment into an account associated with a payment instrument, wherein the payment instrument is used at the electronic device by a merchant for transfer of the payment from a merchant account; authorize the transaction request received from the electronic device based on one or more predetermined rules; generate a direct fund transfer message based on the at least one unique identifier field upon authorization of the transaction request; transmit the direct fund transfer message to an issuer associated with the merchant account for authentication of the direct fund transfer message; and transfer dynamically the payment from the merchant account to the account associated with the payment instrument when the direct fund transfer message is authenticated by the issuer.

Clause 9: The transaction processing system of clause 8, wherein the electronic device is one of a Point-of-Sale (POS) terminal and a kiosk device.

Clause 10: The transaction processing system of clause 8 or 9, wherein the one or more predetermined rules comprise at least one of the following: a POS Personal Identification Number (PIN), a POS identifier, a merchant identifier, capital balance in the account, a past daily average capital amount, or any combination thereof.

Clause 11: The transaction processing system of any of clauses 8-10, wherein the at least one unique identifier field indicates the request for transferring the payment from the merchant account.

Clause 12: The transaction processing system of any of clauses 8-11, wherein the direct fund transfer message comprises at least one of the following: International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof.

Clause 13: The transaction processing system of any of clauses 8-12, wherein the processor is configured to deny transfer of the payment from the merchant account to the account associated with the payment instrument used at the electronic device associated with the transaction processing system when the authentication of the direct fund transfer message is unsuccessful at the issuer.

Clause 14: The transaction processing system of any of clauses 8-13, wherein the authentication by the issuer is based on at least one of the following: an issuer's eligibility for transferring payment, a daily limit to perform the direct fund transfer, network failure in a transaction path, compliance to business rules, compliance to fraud prevention rules, or any combination thereof.

In some non-limiting embodiments or aspects, the present disclosure relates to a method for dynamically processing financial transactions. The method includes receiving a transaction request comprising at least one unique identifier field initiated by an electronic device, associated with the transaction processing system, to transfer payment into an account associated with a payment instrument, and authorizing the transaction request received from the electronic device based on one or more predetermined rules. The payment instrument is used at the electronic device by a merchant for transfer of the payment from a merchant account. The method further includes generating a direct fund transfer message based on the at least one unique identifier field upon authorization of the transaction request, transmitting the direct fund transfer message to an issuer associated with the merchant account for authentication of the direct fund transfer message, and transferring dynamically the payment from the merchant account to the account associated with the payment instrument when the direct fund transfer message is authenticated by the issuer.

In some non-limiting embodiments or aspects, the present disclosure relates to a transaction processing system for dynamically processing financial transactions. The transaction processing system includes a processor and a memory communicatively coupled to the processor, wherein the memory stores processor-executable instructions, which on execution, cause the processor to receive a transaction request comprising at least one unique identifier field initiated by an electronic device, associated with the transaction processing system, to transfer payment into an account associated with a payment instrument, and authorize the transaction request received from the electronic device based on one or more predetermined rules. The payment instrument is used at the electronic device by a merchant for transfer of the payment from a merchant account. The transaction processing system further causes the processor to generate a direct fund transfer message based on the at least one unique identifier field upon authorization of the transaction request, transmit the direct fund transfer message to an issuer associated with the merchant account for authentication of the direct fund transfer message, and transfer dynamically the payment from the merchant account to the account associated with the payment instrument when the direct fund transfer message is authenticated by the issuer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
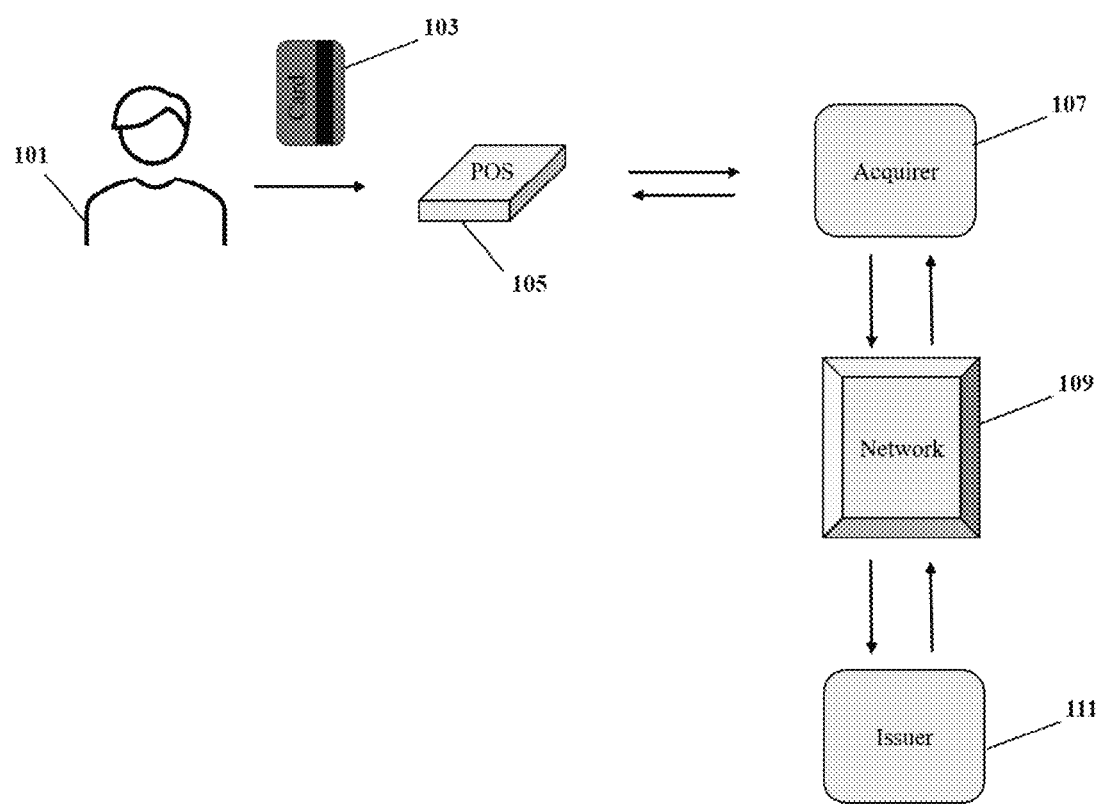
FIG. 1 is an exemplary environment for dynamically processing financial transactions in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" do not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a transaction processing system for dynamically processing financial transactions. The present system and method receive a transaction request comprising at least one unique identifier field initiated by an electronic device to transfer payment into an account associated with a payment instrument. The payment instrument is used at the electronic device by a merchant for transfer of the payment from a merchant account. The received transaction request is authorized based on one or more predetermined rules and subsequently, a direct fund transfer message is generated based on the at least one unique identifier field upon authorization of the transaction request. The direct transfer message is then transmitted to an issuer associated with the merchant account for authentication. On authentication of the direct fund transfer message, the payment is transferred dynamically from the merchant account to the account associated with the payment instrument. The present system and method allow easy processing of financial transactions the same day using existing POS infrastructure of the merchant (e.g., without any additional infrastructure), consequently, helping SME merchants with quick access to their funds.

FIG. 1 illustrates an exemplary environment for dynamically processing financial transactions in accordance with some non-limiting embodiments or aspects of the present disclosure.

As shown in the FIG. 1, the environment includes a merchant 101, a payment instrument 103, an electronic device 105, an acquirer 107, a network 109, and an issuer 111. The payment instrument 103 may be a debit card or a credit card issued by the issuer 111 to the merchant 101. The merchant 101 may have a customer relationship with the issuer 111, which may be responsible for customer underwriting. The issuer 111 may be a financial institution. Additionally, the merchant 101 may have an acquiring or a business relationship with the acquirer 107, which may be responsible for merchant underwriting. The acquirer 107 may be a financial institution different from the issuer 111. In some non-limiting embodiments or aspects, the acquirer 107 and the issuer 111 may be same financial institutions. For conducting financial transactions related to business, the merchant 101 may link the account at the acquirer 107 with the account at the issuer 111 through an addendum for linking accounts with the acquirer 107 and/or the issuer 111.

When the merchant 101 needs access to his/her fund or payment earlier than their funding cycle, the merchant 101 may use the payment instrument 103 at the electronic device 105. The electronic device 105 may be a Point-of-Sale (POS) terminal or a kiosk device. The electronic device 105 may be connected to the acquirer 107 through wired/wireless communication protocols/methods. The communication protocols/methods may include, but are not limited to, a direct interconnection, an e-commerce network, a Peer-to-Peer (P2P) network, Local Area Network (LAN), Wide Area Network (WAN), wireless network (for example, Code-Division Multiple Access (CDMA), High-Speed Packet Access (HSPA+), Global System for Mobile communications (GSM®), Long-Term Evolution (LTE®) and Worldwide interoperability for Microwave access (WiMax®)), the Internet, Wi-Fi®, Bluetooth®, and the like.

Further, the acquirer 107 may be connected to the issuer 111 through the network 109. The network may include, but is not limited to, a direct interconnection, an e-commerce network, a wireless network (for example, Code-Division Multiple Access (CDMA), High-Speed Packet Access (HSPA+), Global System for Mobile communications (GSM®), Long-Term Evolution (LTE®), and Worldwide interoperability for Microwave access (WiMax®)), Internet and the like. In some non-limiting embodiments or aspects, the communication between the acquirer 107 and the issuer 111 may be encrypted.

The acquirer 107 and the issuer 111 each may be a local server or a cloud server hosted by a respective financial institution. The local server or the cloud server may include a processor and a memory (not shown in FIG. 1). The memory may be communicatively coupled to the processor. The memory may also store processor instructions which may cause the processor to execute the instructions for dynamically processing financial transactions. The memory may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, and the like. The processor may include at least one data processor for dynamically processing financial transactions. The processor may include specialized processing units such as integrated system (bus) controllers, memory management control units, floating point units, graphics processing units, digital signal processing units, and the like.

In some non-limiting embodiments or aspects, the electronic device 105, the acquirer 107, the network 109, and the issuer 111 may together form a transaction processing system. In some non-limiting embodiments or aspects, the payment instrument 103 along with the electronic device 105, the acquirer 107, the network 109, and the issuer 111 may together form the transaction processing system.

Figure 2:
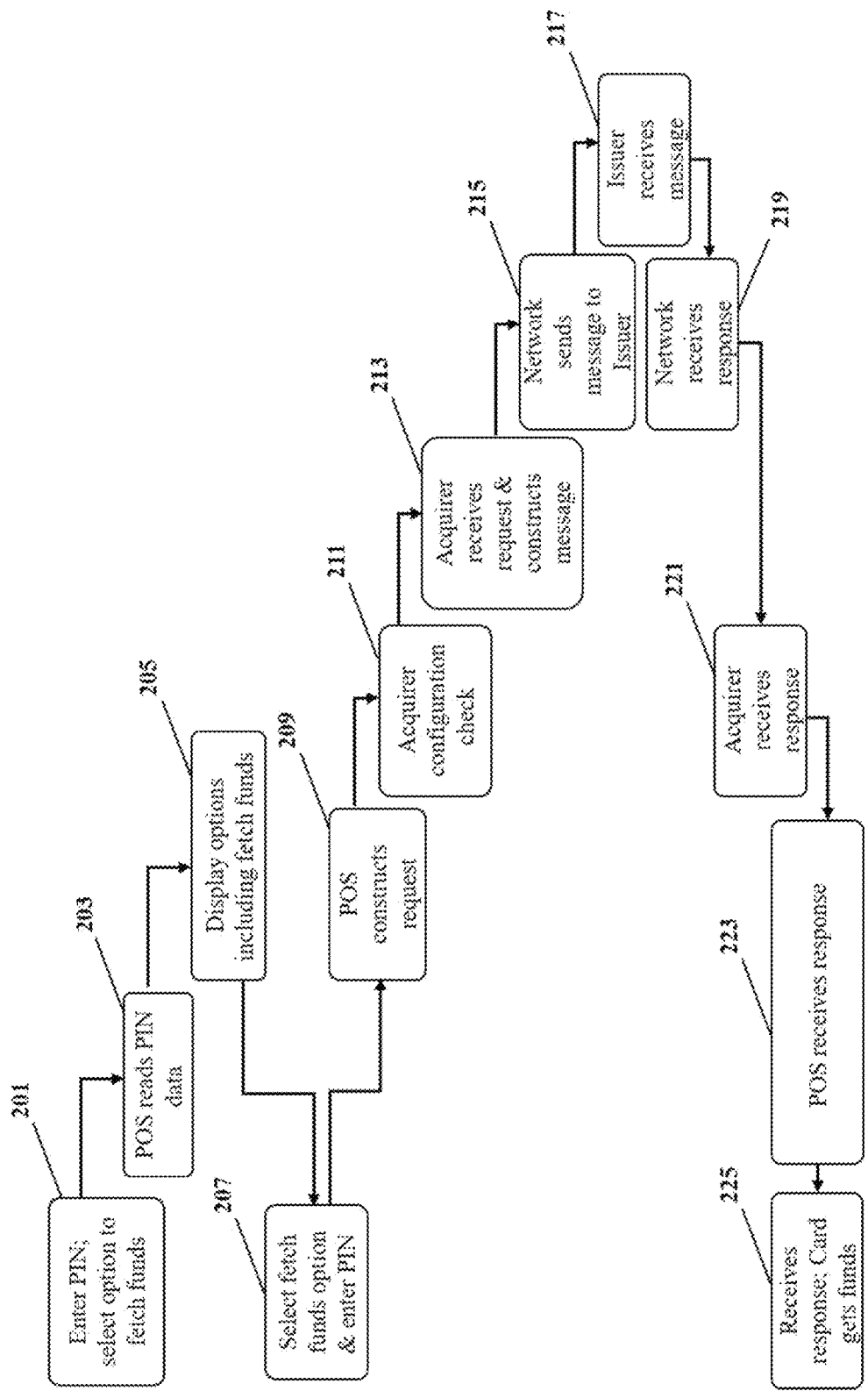
FIG. 2 is a detailed flow diagram for dynamically processing financial transactions in accordance with some non-limiting embodiments or aspects of the present disclosure.

FIG. 2 shows a detailed flow diagram for dynamically processing financial transactions in accordance with some non-limiting embodiments or aspects of the present disclosure.

When the merchant 101 needs access to his/her fund or payment earlier than their funding cycle, the merchant 101 may use his/her payment instrument 103. The merchant 101 may enter their payment instrument 103 in the electronic device 105 at step 201. The electronic device 105 may be a POS terminal or a kiosk device. For simplicity and only for the purpose of illustration, the electronic device 105 is considered to be the POS terminal. The merchant 101 may enter a POS Personal Identification Number (PIN) and select an option to fetch funds. The POS terminal may verify the POS PIN data at step 203. On successful POS PIN verification, the POS terminal may display several options including option to fetch funds at step 205. At this stage, the merchant 101 may select the option to fetch funds and enter a PIN for fetching funds at step 207. On successful PIN verification, the POS terminal may construct a transaction request comprising at least one unique identifier field to transfer payment into an account associated with the payment instrument 103 and send the transaction request to the acquirer 107 at step 209. The acquirer 107, on receiving the transaction request from the POS terminal, may perform configuration check on the transaction request and authorize the transaction request based on one or more predetermined rules at step 211. The one or more predetermined rules may comprise at least one of a POS PIN, a POS identifier, a merchant identifier, a capital balance in the account, and a past daily average capital amount. On successful authorization, the acquirer 107 may generate or construct a direct fund transfer message based on the at least one unique identifier field at step 213. The direct fund transfer message may be in, but is not limited to, one of International Standards Organization (ISO) message format, Association for Payment Clearing Services (APACS) message format, Australia Standards 2805 (AS2805) message format, ISO 20022 message format, a message format defined under Representational State Transfer (REST), and XML based Simple Object Access Protocol (SOAP).

An example of an ISO message format illustrating a direct fund transfer message is shown below. In this example, at least one unique identifier field F48 and F104 (not shown) is used.

F48 Additional Data, Private Use *<<Usage>>*

For direct fund transfer message, the above field F48 may be considered as a mandatory element when a merchant requests for funds using the "fetch funds" option. The field F48 may be modified as shown below:

F48 Additional Data, Private Use *Fetch Funds: Amount as in F4+Special Indicator or agreeing to pay for higher Merchant Discount Rate (MDR) in this AFT request*

Here, AFT refers to Automatic Funds Transfer. The amount requested by the merchant may be mentioned in the field F4. Analogously, the field F104 may be modified (not shown) and utilized independently or in combination with the field F48.

Subsequently, the acquirer 107 may transmit the direct fund transfer message to the issuer 111 associated with the merchant account for authentication of the direct fund transfer message through the network 109 at step 2215. The issuer 111 may receive and authenticate the direct fund transfer message at step 217. The issuer 111 may authenticate the direct fund transfer message based on at least one of an issuer's eligibility for transferring payment, a daily limit to perform fund transfer, network failure in a transaction path, compliance to business rules, and compliance to fraud prevention rules. In detail, once the issuer 111 receives the direct fund transfer message, the issuer 111 may connect with the acquirer 107 for approval of the payment request from the acquirer 107. The acquirer 107 may internally check if a future settlement of an amount equal to or less than the requested amount is available in the merchant's account with the acquirer 107. Once the acquirer 107 confirms that the future funds are available, the acquirer 107 may send an acceptance to the issuer 111. Subsequently, based on the outcome of the authentication process, the issuer 111 may issue a positive or a negative response. For instance, on successful authentication, the issuer 111 may issue a positive response and consequently, transfer dynamically the payment from the merchant account to the account associated with the payment instrument 103 used at the electronic device 105. On an unsuccessful authentication, the issuer 111 may issue a negative response and consequently, deny transfer of the payment from the merchant account to the account associated with the payment instrument 103 used at the electronic device 105. The issuer 111 may send the response to the acquirer through the network 109 at step 219. The acquirer 107 may receive the response at step 221 and subsequently, send the response to the POS terminal. At the POS terminal, the merchant 101 may receive the response at step 223 and transfer dynamically or deny payment from the merchant account to the account associated with the payment instrument 103 used at the electronic device 105 based on the response at step 225.

In a situation when the merchant 101 successfully receives payment earlier than their funding cycle as explained above, the rest of the funds, if any, may be transferred to the account associated with the payment instrument 103 during the regular funding cycle. For instance, during the regular funding cycle, the acquirer 107 may send the funds to the merchant's account after deducting the earlier fetched funds. The funds fetched earlier than their funding cycle may attract a higher MDR, and the remaining funds may be charged a regular MDR based on merchant's contract with the acquirer 107.

Figure 3:
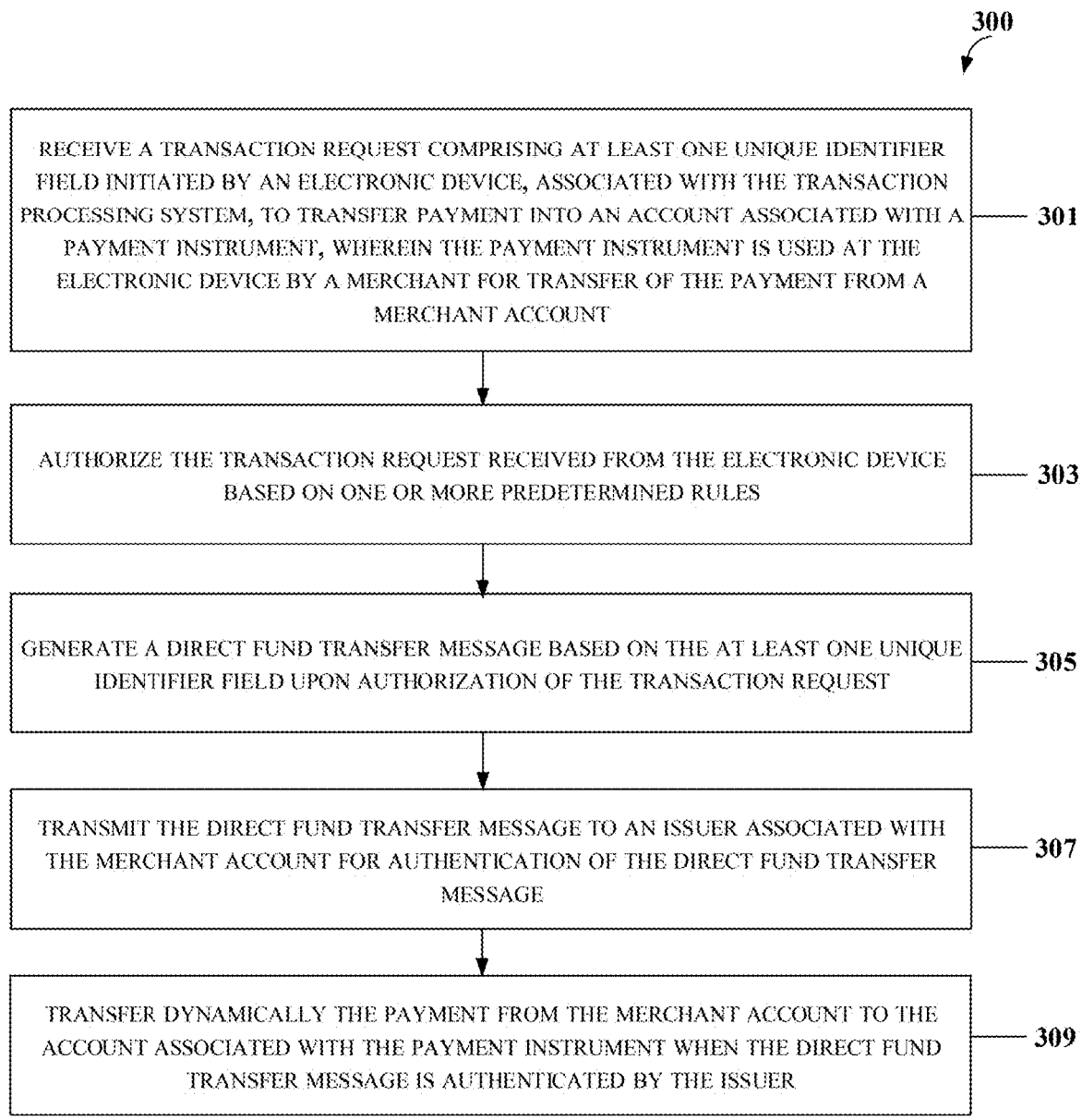
FIG. 3 is a flowchart showing a method for dynamically processing financial transactions in accordance with some non-limiting embodiments or aspects of present disclosure.

FIG. 3 illustrates a flowchart showing a method 300 for dynamically processing financial transactions in accordance with some non-limiting embodiments or aspects of the present disclosure.

As illustrated in FIG. 3, the method 300 includes one or more blocks for dynamically processing financial transactions. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the method without departing from the scope of the subject matter described herein. Furthermore, the method can be implemented in any suitable hardware, software, firmware, or combination thereof.

At block 301, the acquirer 107 of the transaction processing system may receive a transaction request comprising at least one unique identifier field initiated by the electronic device 105, associated with the transaction processing system, to transfer payment into an account associated with the payment instrument 103. The payment instrument 103 may be used at the electronic device 105 by a merchant for transfer of the payment from a merchant account. The electronic device 105 may be one of a Point of Sale (POS) terminal and a kiosk device. The at least one unique identifier field may indicate the request for transferring the payment from the merchant account.

At block 303, the acquirer 107 of the transaction processing system may authorize the transaction request received from the electronic device 105 based on one or more predetermined rules. The one or more predetermined rules may comprise at least one of a POS PIN, a POS identifier, a merchant identifier, a capital balance in the account, and a past daily average capital amount.

At block 305, the acquirer 107 of the transaction processing system may generate a direct fund transfer message based on the at least one unique identifier field upon authorization of the transaction request. The direct fund transfer message may be one of ISO message format, APACS message format, AS2805 message format, ISO 20022 message format, a message format defined under REST, and XML based SOAP.

At block 307, the acquirer 107 of the transaction processing system may transmit the direct fund transfer message to the issuer 111 associated with the merchant account for authentication of the direct fund transfer message.

At block 309, the issuer 111 of the transaction processing system may transfer dynamically the payment from the merchant account to the account associated with the payment instrument 103 when the direct fund transfer message is authenticated by the issuer 111. The authentication by the issuer may be based on at least one of an issuer's eligibility for transferring payment, a daily limit to perform the fund transfer, network failure in a transaction path, compliance to business rules, and compliance to fraud prevention rules.

Some of the advantages of the present disclosure include: (1) allows easy processing of financial transactions as the method uses existing POS infrastructure of the merchant without any additional infrastructure; (2) allows processing of financial transactions the same day, consequently, helping SME merchants with quick access to their funds; (3) includes adequate security checks for authenticating a payment request from a merchant, thereby, preventing any possibility of fraud or anonymous payment request on behalf of the merchant; and (4) allows a traveler to fund their payment instrument, for example, a prepaid card at any POS terminal/Automated Teller Machine (ATM) with ease.

Figure 4:
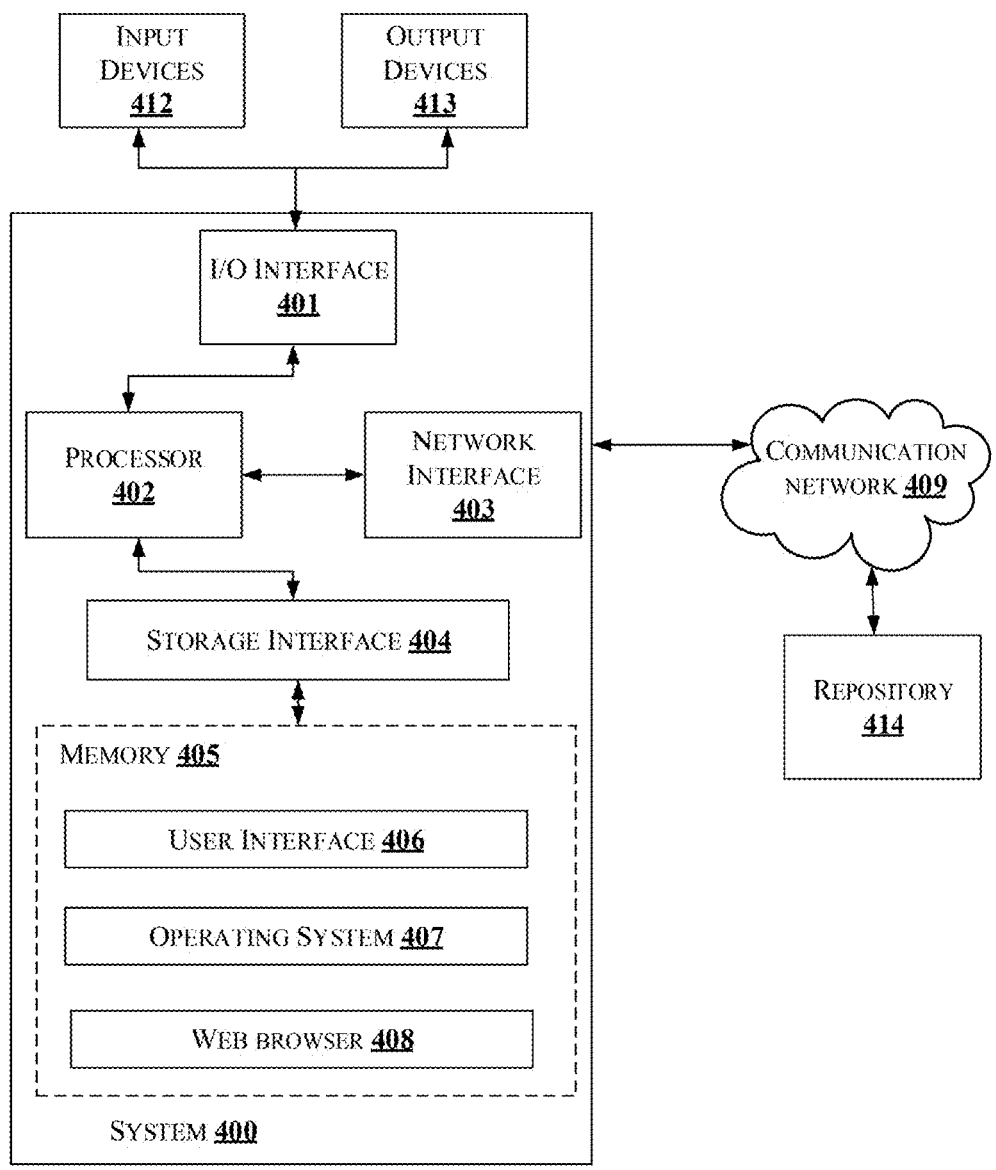
FIG. 4 is a block diagram of an exemplary system for implementing embodiments consistent with the present disclosure.

FIG. 4 illustrates a block diagram of an exemplary system 400 for implementing embodiments consistent with the present disclosure. In some non-limiting embodiments or aspects, the system 400 may be used for dynamically processing financial transactions. The system 400 may include a central processing unit ("CPU" or "processor") 402. The processor 402 may include at least one data processor for dynamically processing financial transactions. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via an I/O interface 401. The I/O interface 401 employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax®), or the like, etc.

Using the I/O interface 401, the system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some non-limiting embodiments or aspects, the system 400 consists of the transaction processing system. The processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 may include, without limitation, a direct interconnection, Local Area Network (LAN), Wide Area Network (WAN), wireless network (e.g., using Wireless Application Protocol), the Internet, etc. Using the network interface 403 and the communication network 409, the system 400 may communicate with a repository 414. The network interface 403 may employ connection protocols that include, but are not limited to, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 includes, but is not limited to, a direct interconnection, a Peer to Peer (P2P) network, LAN, WAN, a wireless network (e.g., using Wireless Application Protocol), the Internet, Wi-Fi®, and such.

In some non-limiting embodiments or aspects, the processor 402 may be disposed in communication with a memory 405 (e.g., RAM, ROM, etc. not shown in FIG. 4) via a storage interface 404. The storage interface 404 may connect to the memory 405 including, without limitation, memory drives, removable disc drives, etc., employing connection protocols such as, Serial Advanced Technology Attachment (SATA), Integrated Drive Electronics (IDE), IEEE-1394, USB, fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, etc. In some non-limiting embodiments or aspects, the system 400 may store user/application data, such as the data, variables, records, etc., as described in this disclosure. Such databases may be implemented as fault-tolerant, relational, scalable, secure databases such as Oracle® or Sybase®.

The operating system 407 may facilitate resource management and operation of the system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some non-limiting embodiments or aspects, the system 400 may implement web browser stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. The system 400 may implement a mail server (not shown in FIG. 4) stored program component. The mail server may be an Internet mail server such as MICROSOFT® Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The system 400 may implement a mail client (not shown in FIG. 4) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer-readable medium and/or hardware logic in which code may be implemented. A device in which the code implementing the described embodiments of operations is encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", "some-non-limiting embodiments or aspects", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

A description of some non-limiting embodiments or aspects with several components in communication with each other does not imply that all such components are required. On the contrary, a variety of optional components is described to illustrate the wide variety of possible embodiments of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for dynamically processing financial transactions, the method comprising:

displaying, by an electronic device, at least one selectable option via a display of the electronic device, the at least one selectable option comprising a selectable option to fetch funds, the electronic device comprising at least one of a Point-of-Sale (POS) terminal or a kiosk device;

receiving, by the electronic device, a selection of the selectable option to fetch funds and a personal identification number (PIN) associated with a payment instrument from a merchant, wherein the payment instrument is used at the electronic device by the merchant for transfer of a payment from a merchant account into an account associated with the payment instrument;

generating, by the electronic device, a transaction request to transfer the payment from the merchant account into the account associated with the payment instrument in response to verifying the PIN associated with the payment instrument, the transaction request comprising at least one unique identifier field comprising an indication that the transaction request is for transferring the payment into the account associated with the payment instrument during a first funding period, wherein the first funding period is earlier than a second funding period, wherein the first funding period is associated with a first merchant discount rate, and wherein the second funding period is associated with a second merchant discount rate that is lower than the first merchant discount rate;

receiving, by an acquirer server from the electronic device, the transaction request to transfer the payment into the account associated with the payment instrument, the payment comprising a first portion of an amount available in the merchant account, wherein the first portion is related to the first merchant discount rate and the first funding period;

authorizing, by the acquirer server, the transaction request received from the electronic device based on one or more predetermined rules;

generating, by the acquirer server, a direct fund transfer message based on the at least one unique identifier field upon authorization of the transaction request;

modifying, by the acquirer server, the at least one unique identifier field of the direct fund transfer message to include a special indicator, the special indicator comprising the first merchant discount rate;

transmitting, by the acquirer server, the direct fund transfer message including the special indicator to an issuer server associated with the merchant account for authentication of the direct fund transfer message;

in response to receiving and authenticating the direct fund transfer message including the special indicator, requesting, by the issuer server, an approval from the acquirer server;

confirming, by the acquirer server, a future settlement amount corresponding to the payment is available in the merchant account based on the direct fund transfer message including the special indicator;

in response to confirming the future settlement amount is available in the merchant account, communicating, by the acquirer server, an approval to the issuer server;

after receiving the approval, authenticating, by the issuer server, the direct fund transfer message including the special indicator; and transferring dynamically, by the issuer server or the merchant, the payment from the merchant account to the account associated with the payment instrument within the first funding period in response to the direct fund transfer message including the special indicator comprising the first merchant discount rate being authenticated by the issuer server, wherein a second portion of the amount available in the merchant account is transferred during the second funding period, and wherein the second portion of the amount is related to the second merchant discount rate and the second funding period.

2. The method as claimed in claim 1, wherein the one or more predetermined rules comprise at least one of the following: a POS PIN, a POS identifier, a merchant identifier, capital balance in the account, a past daily average capital amount, or any combination thereof.

3. The method as claimed in claim 1, wherein the direct fund transfer message comprises at least one of the following: International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof.

4. The method as claimed in claim 1, wherein the authentication by the issuer server is based on at least one of the following: an issuer's eligibility for transferring payment, a daily limit to perform a direct fund transfer, network failure in a transaction path, compliance to business rules, compliance to fraud prevention rules, or any combination thereof.

5. A transaction processing system for dynamically processing financial transactions, the transaction processing system comprising:

at least one processor of an acquirer server;

a memory communicatively coupled to the at least one processor of the acquirer server, wherein the memory stores processor-executable instructions, which on execution, cause the at least one processor of the acquirer server to:

display at least one selectable option via a display of an electronic device, the at least one selectable option comprising a selectable option to fetch funds, the electronic device comprising at least one of a Point-of-Sale (POS) terminal or a kiosk device;

receive a selection of the selectable option to fetch funds and a personal identification number (PIN) associated with a payment instrument from a merchant, wherein the payment instrument is used at the electronic device by the merchant for transfer of a payment from a merchant account into an account associated with the payment instrument;

generate a transaction request to transfer the payment from the merchant account into the account associated with the payment instrument in response to verifying the PIN associated with the payment instrument, the transaction request comprising at least one unique identifier field comprising an indication that the transaction request is for transferring the payment into the account associated with the payment instrument during a first funding period, wherein the first funding period is earlier than a second funding period, wherein the first funding period is associated with a first merchant discount rate, and wherein the second funding period is associated with a second merchant discount rate that is lower than the first merchant discount rate;

receive the transaction request to transfer the payment into the account associated with a payment instrument, the payment comprising a first portion of an amount available in the merchant account, wherein the first portion of the amount is related to the first merchant discount rate and the first funding period;

authorize the transaction request received from the electronic device based on one or more predetermined rules;

generate a direct fund transfer message based on the at least one unique identifier field upon authorization of the transaction request;

modify the at least one unique identifier field of the direct fund transfer message to include a special indicator, the special indicator comprising the first merchant discount rate; and transmit the direct fund transfer message including the special indicator to an issuer server associated with the merchant account for authentication of the direct fund transfer message;

at least one processor of the issuer server; and a memory communicatively coupled to the at least one processor of the issuer server, wherein the memory stores processor-executable instructions, which on execution, cause the at least one processor of the issuer server to:

in response to receiving and authenticating the direct fund transfer message including the special indicator, request an approval from the acquirer server;

wherein the instructions further cause the at least one processor of the acquirer server to:

confirm a future settlement amount corresponding to the payment is available in the merchant account based on the direct fund transfer message including the special indicator; and in response to confirming the future settlement amount is available in the merchant account, communicate an approval to the issuer server; and wherein the instructions further cause the at least one processor of the issuer server to:

after receiving the approval, authenticate the direct fund transfer message including the special indicator; and transfer dynamically the payment from the merchant account to the account associated with the payment instrument within the first funding period in response to the direct fund transfer message including the special indicator comprising the first merchant discount rate being authenticated by the issuer server, wherein a second portion of the amount available in the merchant account is transferred during the second funding period, and wherein the second portion is related to the second merchant discount rate and the second funding period.

6. The transaction processing system as claimed in claim 5, wherein the one or more predetermined rules comprise at least one of the following: a POS PIN, a POS identifier, a merchant identifier, capital balance in the account, a past daily average capital amount, or any combination thereof.

7. The transaction processing system as claimed in claim 5, wherein the direct fund transfer message comprises at least one of the following:

International Standards Organization (ISO) message format, Association for Payment Clearing Services (APACS) message format, Australia Standards 2805 (AS2805) message format, ISO 20022 message format, message format defined under Representational State Transfer (REST), XML based Simple Object Access Protocol (SOAP), or any combination thereof.

8. The transaction processing system as claimed in claim 5, wherein the authentication by the issuer server is based on at least one of the following: an issuer's eligibility for transferring payment, a daily limit to perform a direct fund transfer, network failure in a transaction path, compliance to business rules, compliance to fraud prevention rules, or any combination thereof.

* * * * *